United States Patent [19]

Chai-I Fan

[11] Patent Number: 5,263,150
[45] Date of Patent: Nov. 16, 1993

[54] COMPUTER SYSTEM EMPLOYING ASYNCHRONOUS COMPUTER NETWORK THROUGH COMMON MEMORY

[76] Inventor: Chai-I Fan, 4300-1 Alpha Rd., Ste. 103, Dallas, Tex. 75075

[21] Appl. No.: 511,636

[22] Filed: Apr. 20, 1990

[51] Int. Cl.$^5$ .................. G06F 1/04; G06F 13/00
[52] U.S. Cl. ................... 395/550; 395/425; 364/DIG. 2; 364/950; 364/950.1
[58] Field of Search ........... 395/425, 500, 250, 325, 395/550, 425; 377/39, 52

[56] References Cited

U.S. PATENT DOCUMENTS

| | | | |
|---|---|---|---|
| 3,551,892 | 12/1970 | Driscoll, Jr. | 395/200 |
| 3,715,719 | 2/1973 | Mercy | 395/550 |
| 3,753,232 | 8/1973 | Sporer | 395/425 |
| 4,164,787 | 8/1979 | Aranguren | 395/425 |
| 4,604,683 | 8/1986 | Russ et al. | 395/325 |
| 4,615,017 | 9/1986 | Finlay et al. | 395/325 |
| 4,841,178 | 6/1989 | Bisson | 307/518 |
| 4,949,249 | 8/1990 | Lefsky et al. | 395/550 |
| 4,987,529 | 1/1991 | Craft et al. | 395/325 |
| 5,029,076 | 7/1991 | Stewart et al. | 395/325 |
| 5,045,999 | 9/1991 | Danilenko et al. | 395/550 |
| 5,047,921 | 9/1991 | Kinter et al. | 395/550 X |

OTHER PUBLICATIONS

Wyland, David C., "Dual-Port Rams Simplify Communication in Computer Systems," Integrated Device Technology, Inc., Application Note AN-02, 1986, pp. 1-10.

Primary Examiner—Paul V. Kulik
Attorney, Agent, or Firm—Timmons & Kelly

[57] ABSTRACT

A plurality of computers or buses share a common memory system having a common memory, a plurality of front end circuits corresponding to the plurality of computers or buses, an internal logic circuit and internal address and memory buses. The plurality of computers or buses use certain locations in common memory to lock other computers or buses and to determine priority. The internal logic circuit generates hardware interrupts and synchronizes signals coming in through the front end circuits with the internal clock.

14 Claims, 16 Drawing Sheets

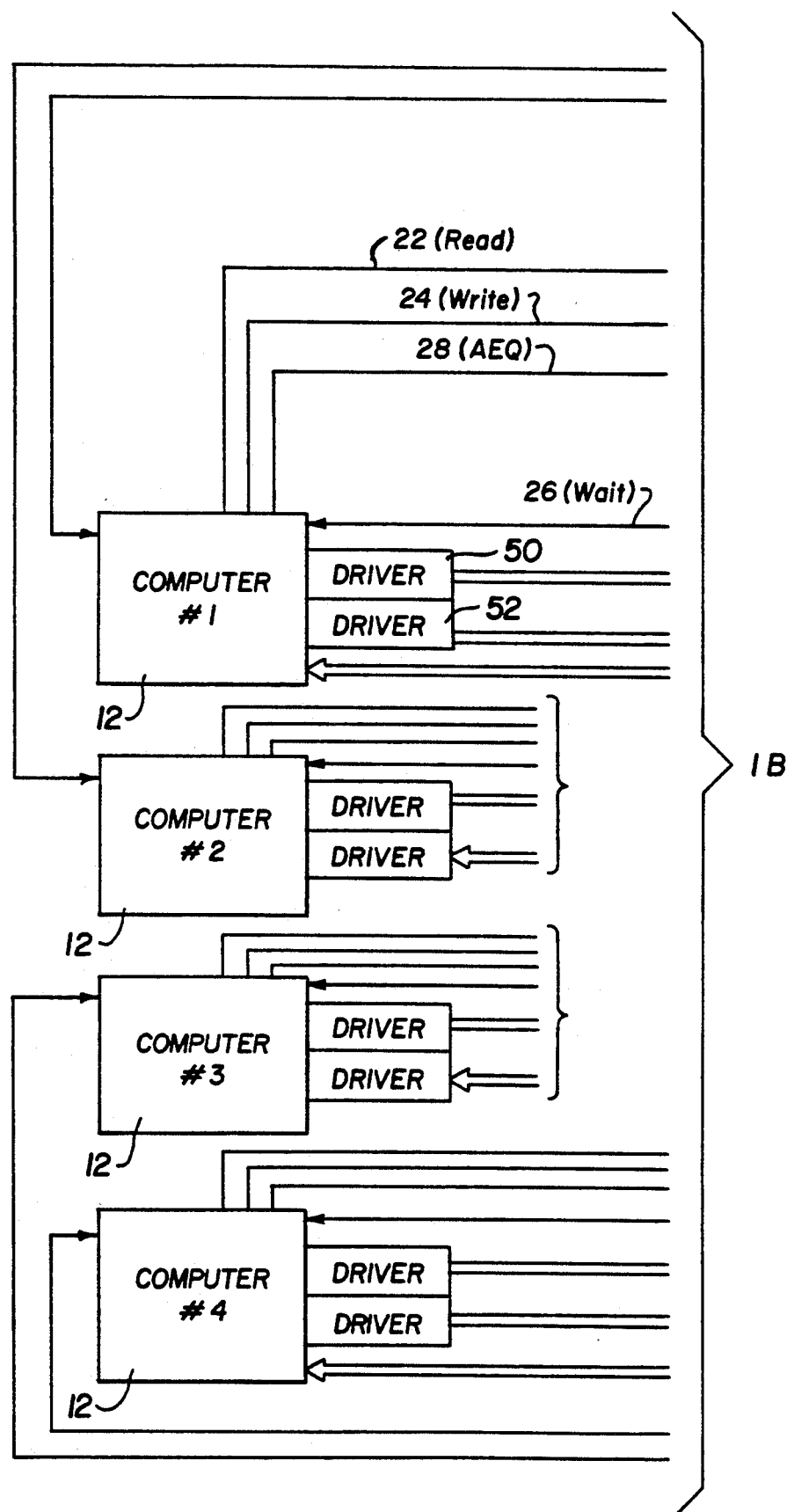
Fig. IA

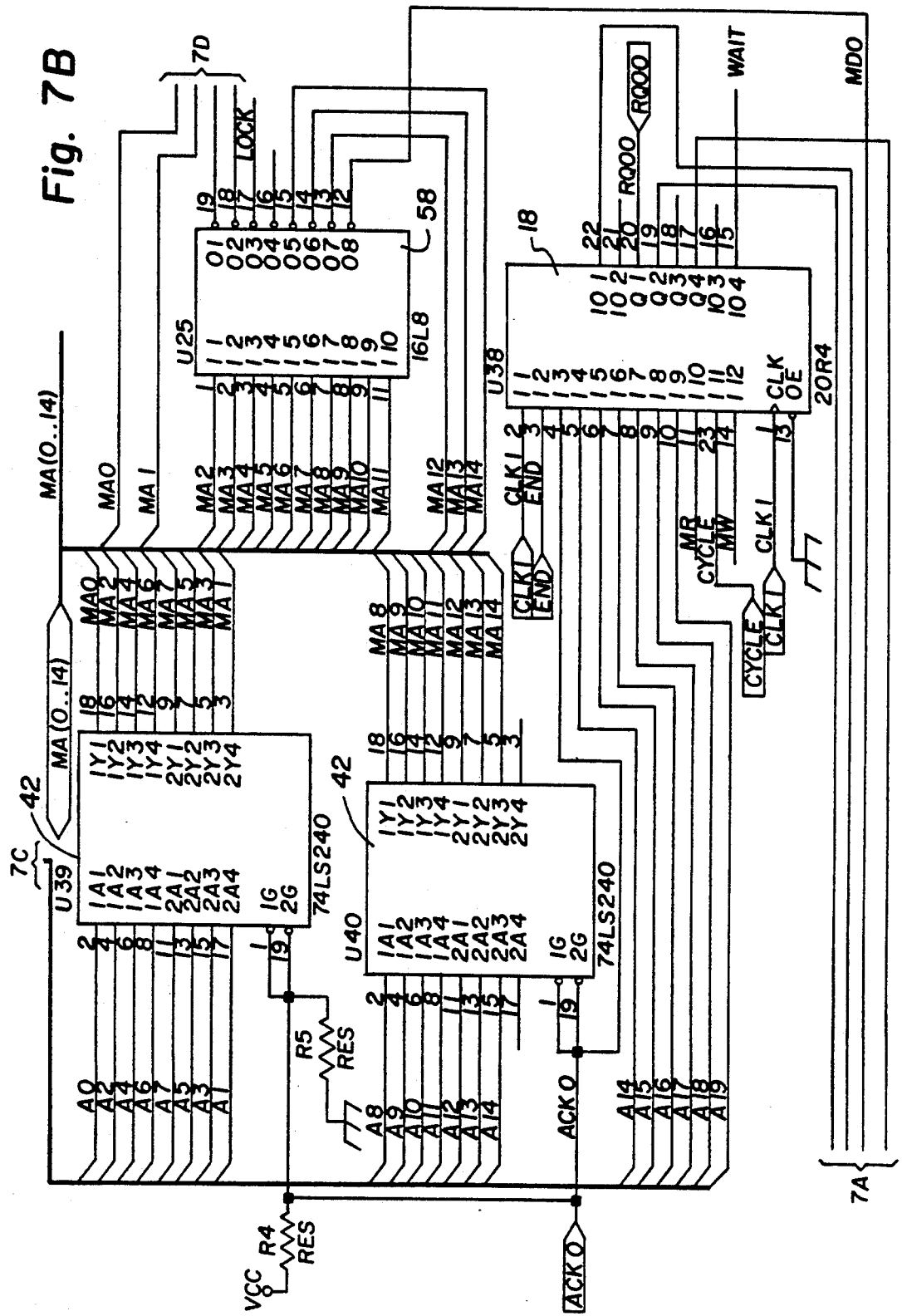

COMPUTER SYSTEM EMPLOYING ASYNCHRONOUS COMPUTER NETWORK THROUGH COMMON MEMORY

TECHNICAL FIELD

The present invention relates to computer networks and in one of its aspects to a computer system having a plurality of computers which are not synchronized but which share a common memory.

In order for a number of computers to be connected as a network and to share a common memory, the network must have some way of determining which of the computers can read or write the memory at any one time. It must also find a method to pass data between buses with different speeds. Since the computers do not operate on the same clock, they are not necessarily synchronized.

BACKGROUND ART

In the past, each computer in a network would try to communicate with all of the other computers in the network to determine priority with respect to a shared bus. Thus, if a network included four computers, then each computer would have to communicate with three other computers by means of a shared bus. If a fifth computer is added, then each computer would have to communicate with four other computers and so on. A ranking of computers could be established, but the problem still remained. The problem was made worse because of the distances between the computers and the length of the bus, such distances further slowing operation time. If five computers communicate through a bus, the bus would have to be five times as fast as one of the computers. Adding more computers would require lengthening the bus, but a longer bus slows down the bus speed. The more computers connected to the bus, the worse the quality of operation. The faster the bus, the more difficult it is to connect computers onto it. Further, the bus is synchronous, whereas the software is asynchronous.

DISCLOSURE OF INVENTION

A computer system according to the present invention includes a shared computer memory system that interfaces with a plurality of computers or buses. The shared computer memory system includes a common memory, a plurality of front end circuits, a shared internal circuit and shared memory buses. Each front end circuit includes a logic part and a driver part, and is operatively connected directly to one of the plurality of computers or the computer's bus through a communications cable for each such computer. The shared internal logic circuit includes a timing sequencer, interrupt and lock logic, and an address decoder. There is no external shared bus. A front end logic circuit requests service from the timing sequencer when the computer associated with that front end logic circuit attempts to read from or write to the common memory. The computer is allowed to, in effect, read from or write to the common memory if the memory is not currently being used by another computer.

A locking circuit sets and resets a locking state associated with each computer in response to the timing sequencer. An interrupt circuit sets and resets interrupt signals that go to each computer.

One preferred arrangement includes a front end address driver controlled by the timing sequencer through the front end logic, a front end data driver controlled by the front end logic circuit, a computer address cable, a computer data cable, a computer address cable driver if it is required, a computer data cable driver if it is required, a memory address bus and a memory data bus. The computer address and data cable drivers drive the computer address and data cables respectively, responsive to their particular computer. The front end address and data drivers drive the memory address and data buses respectively, responsive to the computer address and data cables respectively, but the memory data bus driver can also drive the computer data cable responsive to the memory data bus. In one arrangement, the system also includes an address decoder responsive to the memory address bus and operatively connected to the interrupt and lock logic circuit for decoding the internal address received from the memory address bus and sending an address match signal to the interrupt and lock logic circuit.

These and other objects, advantages and features of this invention will be apparent from the following description taken with reference to the accompanying drawing, wherein is shown the preferred embodiments of the invention.

BRIEF DESCRIPTION OF THE DRAWING

FIGS. 1A, 1B and 1C, taken together, are a block diagram representation of a computer system according to the present invention including a shared computer memory system according to the present invention;

FIGS. 7A, 7B, 7C, 7D, taken together, are a wiring diagram of showing a second front end circuit, an interrupt and lock logic circuit, and an address decoder of the shared computer memory system of FIGS. 6A, 6B, 6C, 6D, 6E and 6F.

BEST MODE FOR CARRYING OUT THE INVENTION

Figure 1B:
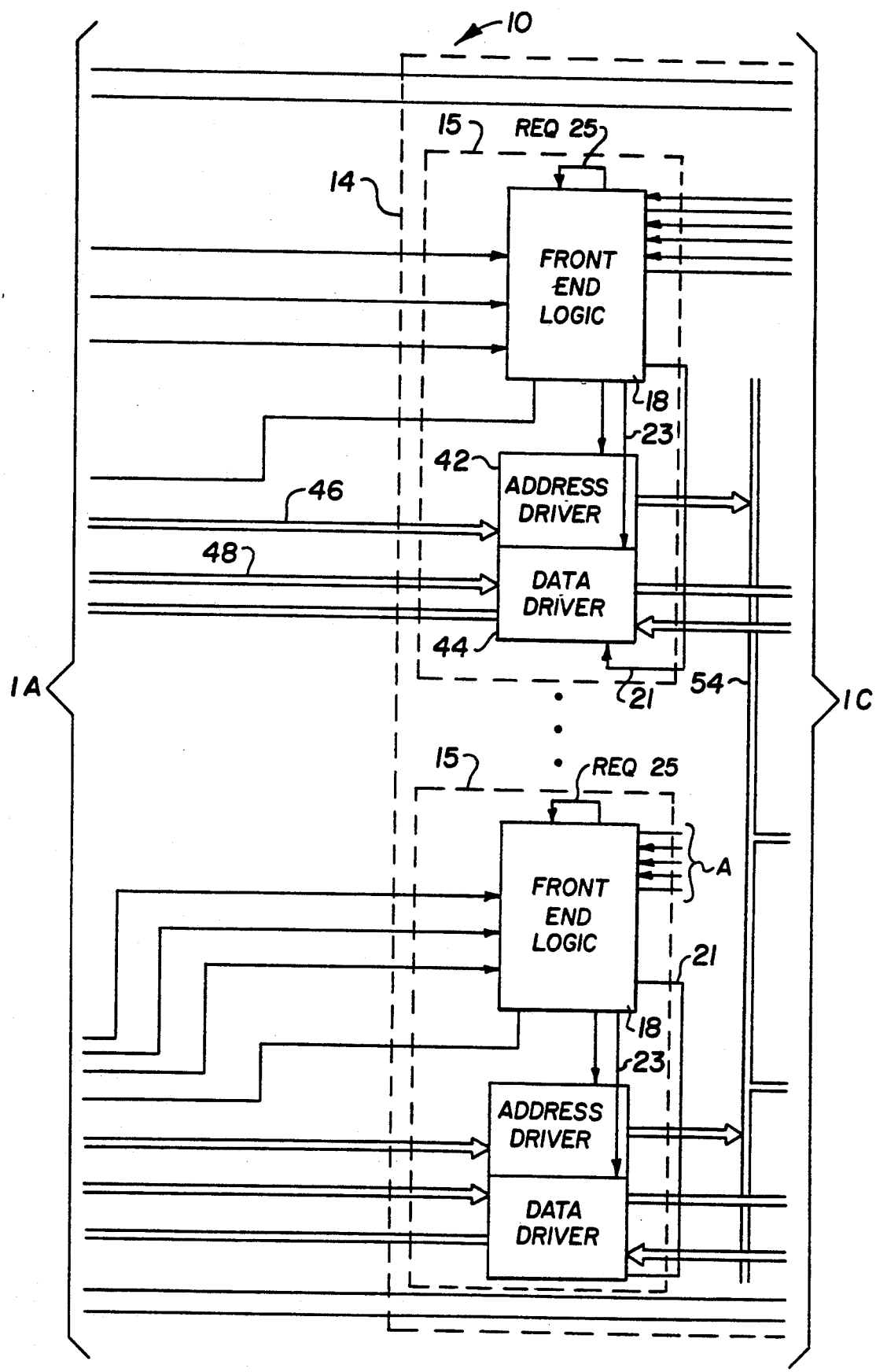
Figure 1C:
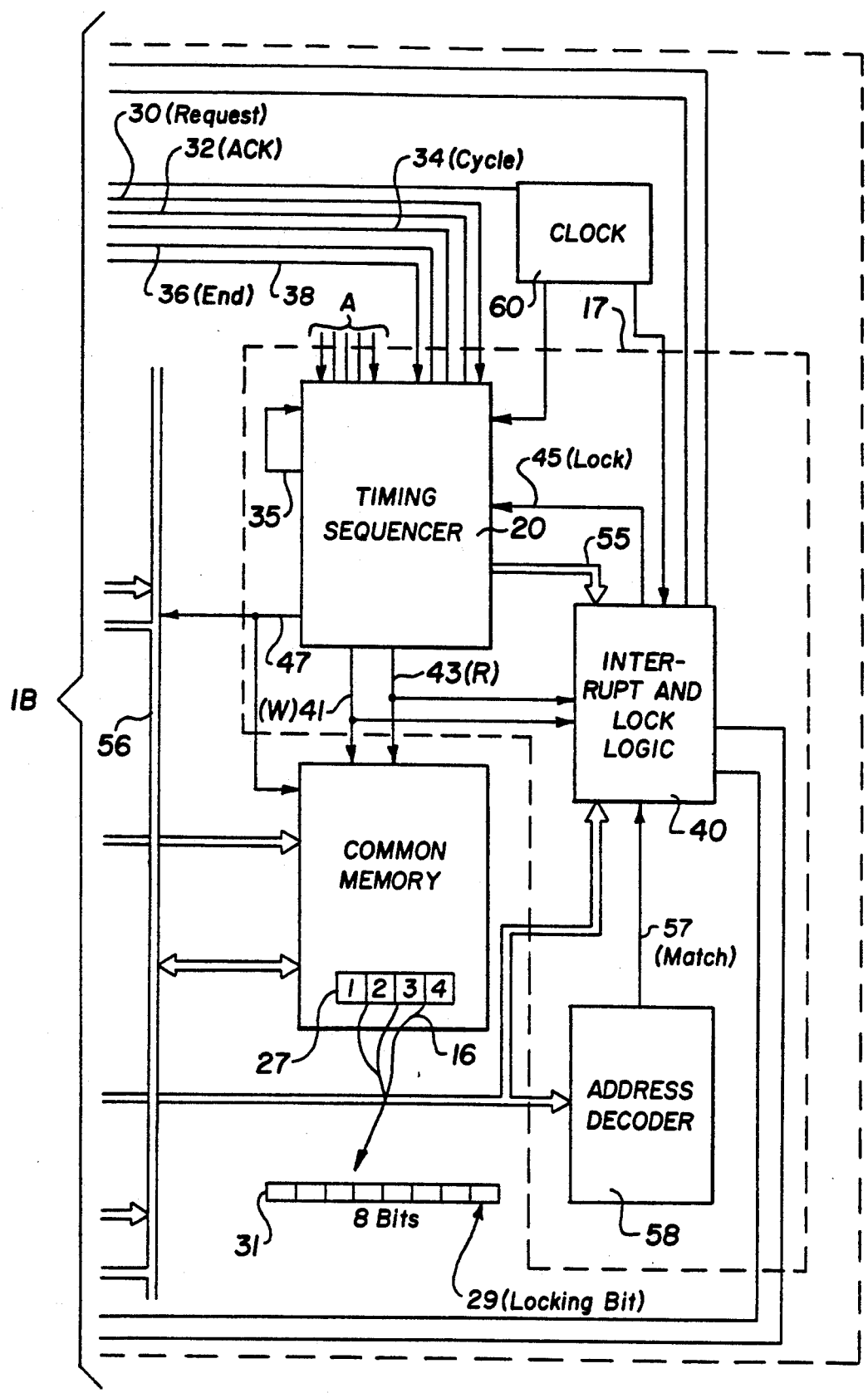

Referring now to the drawing, and in particular to FIG. 1, a computer system according to the present invention is referred to generally by reference numeral 10. Computer system 10 includes a plurality of computers 12 and a shared computer memory system 14 also according to the present invention. Shared computer memory system 14 includes a memory 16 which is common to all of the computers 12, a plurality of front end circuits 15 corresponding to the plurality of computers and internal service logic 17. Each front end circuit 15 includes a front end logic circuit 18 operatively connected to one of the computers 12. Each port of the shared memory system thus has its own front end logic although not all are shown in the figure. A computer 12 can make a READ request 22 or a WRITE request 24 from front end logic circuit 18, and front end logic circuit 18 can direct the computer to wait 26. The front end logic will not generate a request 30 to internal service logic until it receives an address equal signal 28 from its computer. Along with a READ or WRITE request, computer 12 sends an address equal signal 28 to let the front end logic circuit know that the computer memory READ/WRITE will read or write to common memory 16.

Internal service logic 17 includes a timing sequencer 20 operatively connected to both common memory 16 and the plurality of front end logic circuits 18. A front end logic circuit generates a request REQ signal 25 which generates request 30 which in turn guarantees one access to the memory. Both REQ and REQUEST are synchronous with the internal logic, to timing sequencer 20 for service when the computer 12 associated with that particular front end logic circuit attempts to read from or write to the common memory. The generation of signals REQ and REQUEST is the key point of synchronization between the computers and the memory system. REQ is generated in active high time of the internal clock, which guarantees a half internal clock cycle time for REQUEST signal's set-up time. The circuit to generate the REQ signal is the self latch circuit. After the internal service logic has had time for a response, then timing sequencer 20 sends an acknowledgement 32. A disable signal is generated to stop the rest of REQUEST signal from generating another memory read or write. A wait signal is generated to tell a computer to wait before acknowledgement. Its implementation is dependant on the computer requirement, but if it needs synchronization, it can use the same method as generated the REQ signal to synchronize with the computer.

Figure 2:
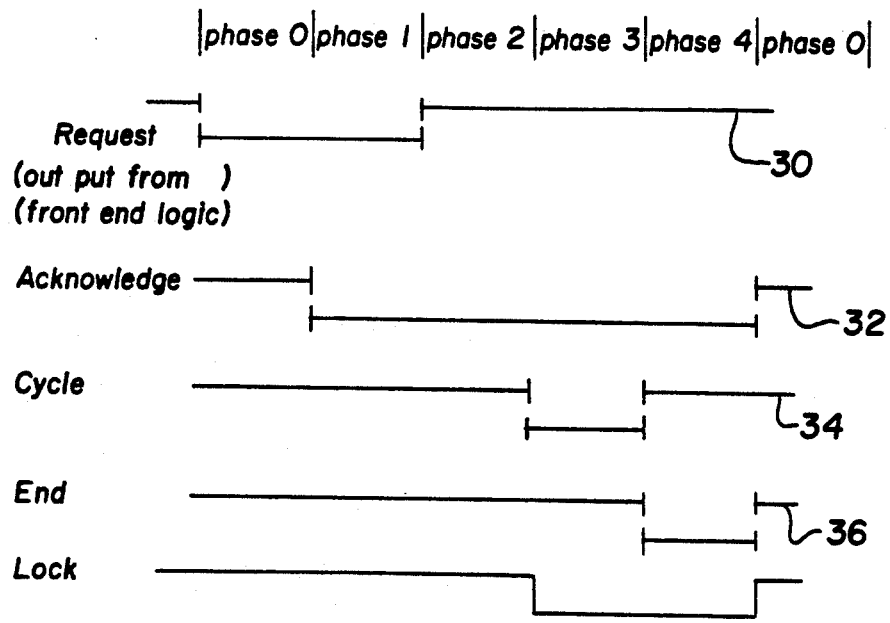
FIG. 2 is a timing diagram showing the relationship between a front end logic circuit and the internal logic circuit thereof.
Figure 3:
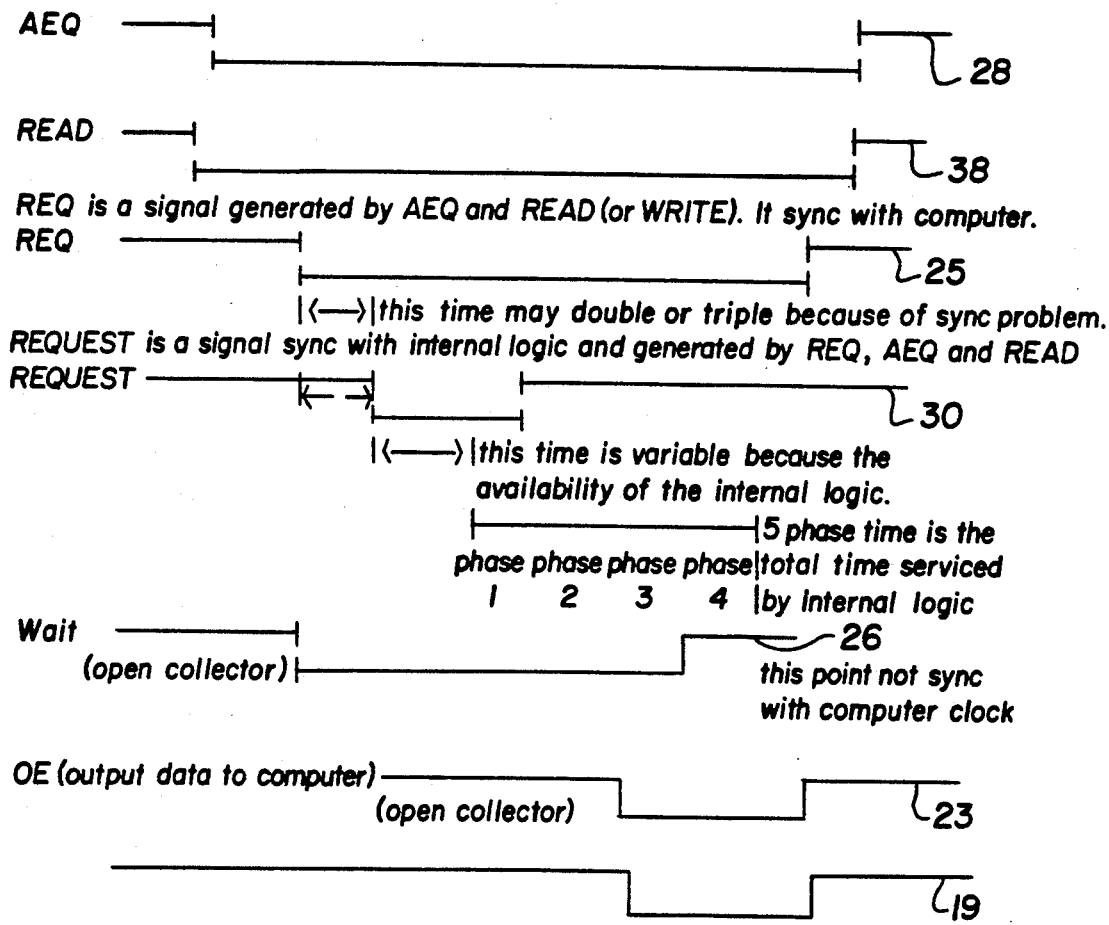
FIG. 3 is a timing diagram of a front end logic circuit thereof for a READ.

Referring also to FIG. 2 and FIG. 3, the timing sequencer also sends two timing signals, cycle 34 and end 36. A R/W signal 38 informs the timing sequencer of what is requested. The timing sequencer sends a R(read) 43 or W(write) 41 signal to both common memory 16 and an interrupt and lock circuit 40.

In one arrangement, internal service logic 17 also includes an address decoder 58 responsive to memory address bus 54 and operatively connected to interrupt and lock logic circuit 40 for decoding the internal address received from the memory address bus and sending an address match 57 signal to interrupt and lock logic 40.

Interrupt and lock circuit 40 is operatively connected to both timing sequencer 20 and the plurality of computers 12. Interrupt and lock circuit 40 sets and resets interrupt signals in the computers responsive to timing sequencer 20, when there is a W(write) signal and address decoder 58 matches a special address which can be changed. The interrupt and lock logic also sets and resets a locking state for each individual computer 12. When one of the plurality of computers writes to a special location 27 in common memory 16, normally the first byte of common memory, it sets its own locking state, bit 29 which acts as a locking semaphore and can be one bit of any byte in the whole common memory. The next READ will cause the interrupt and lock logic to set the locking bit 29 which acts as a semaphore and issue a W(write) after the R(read).

Figure 7A:
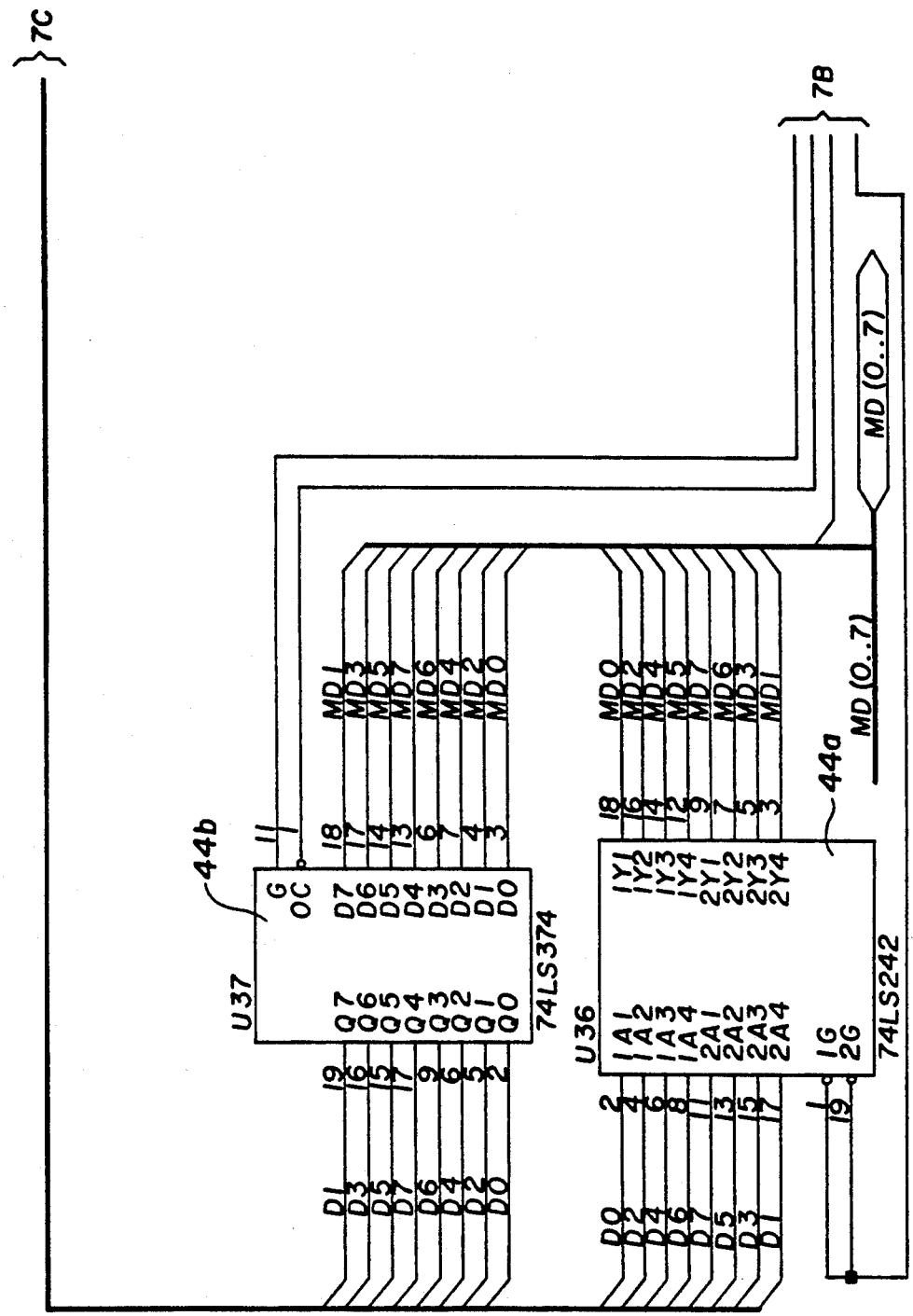
Figure 7C:
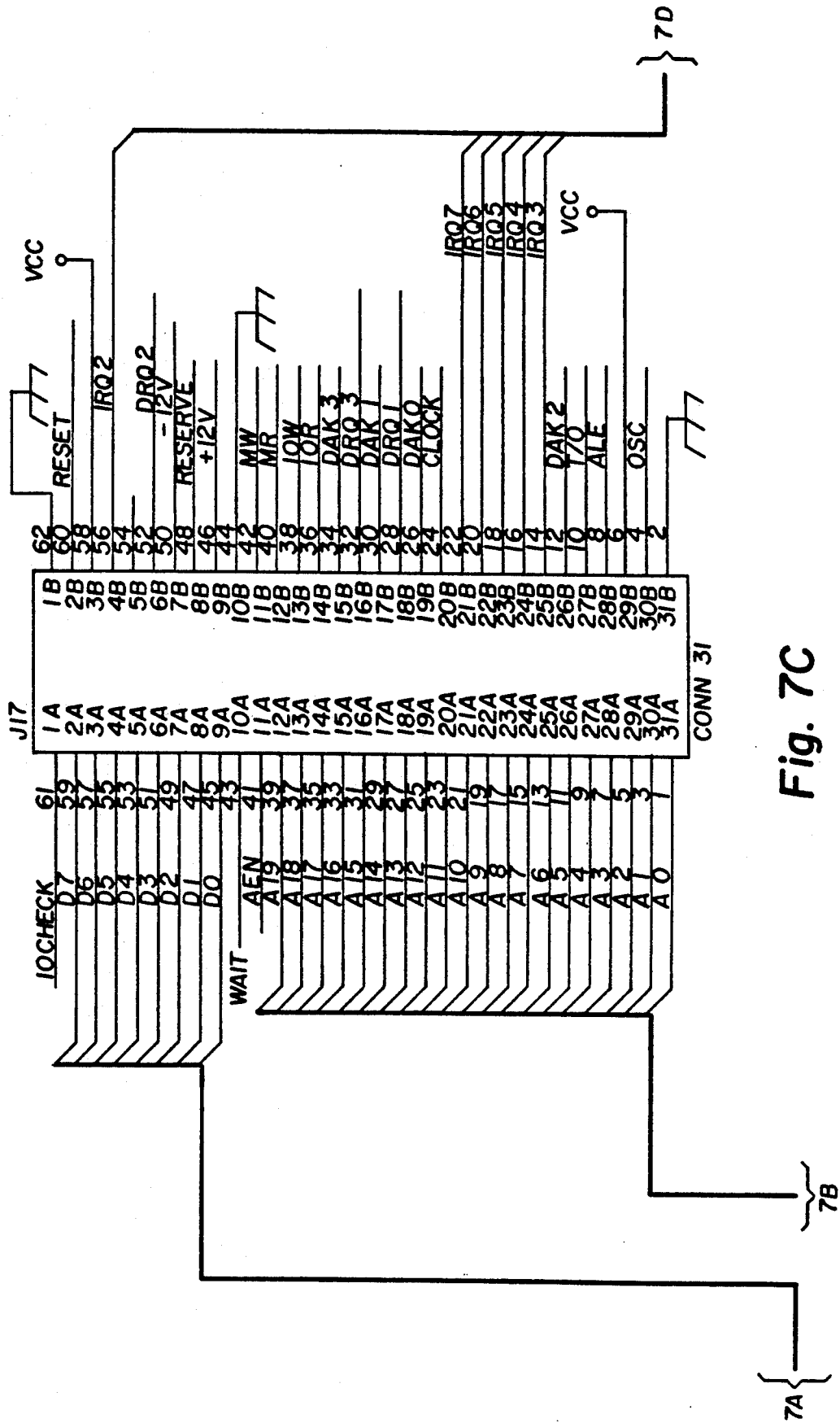
Figure 7D:
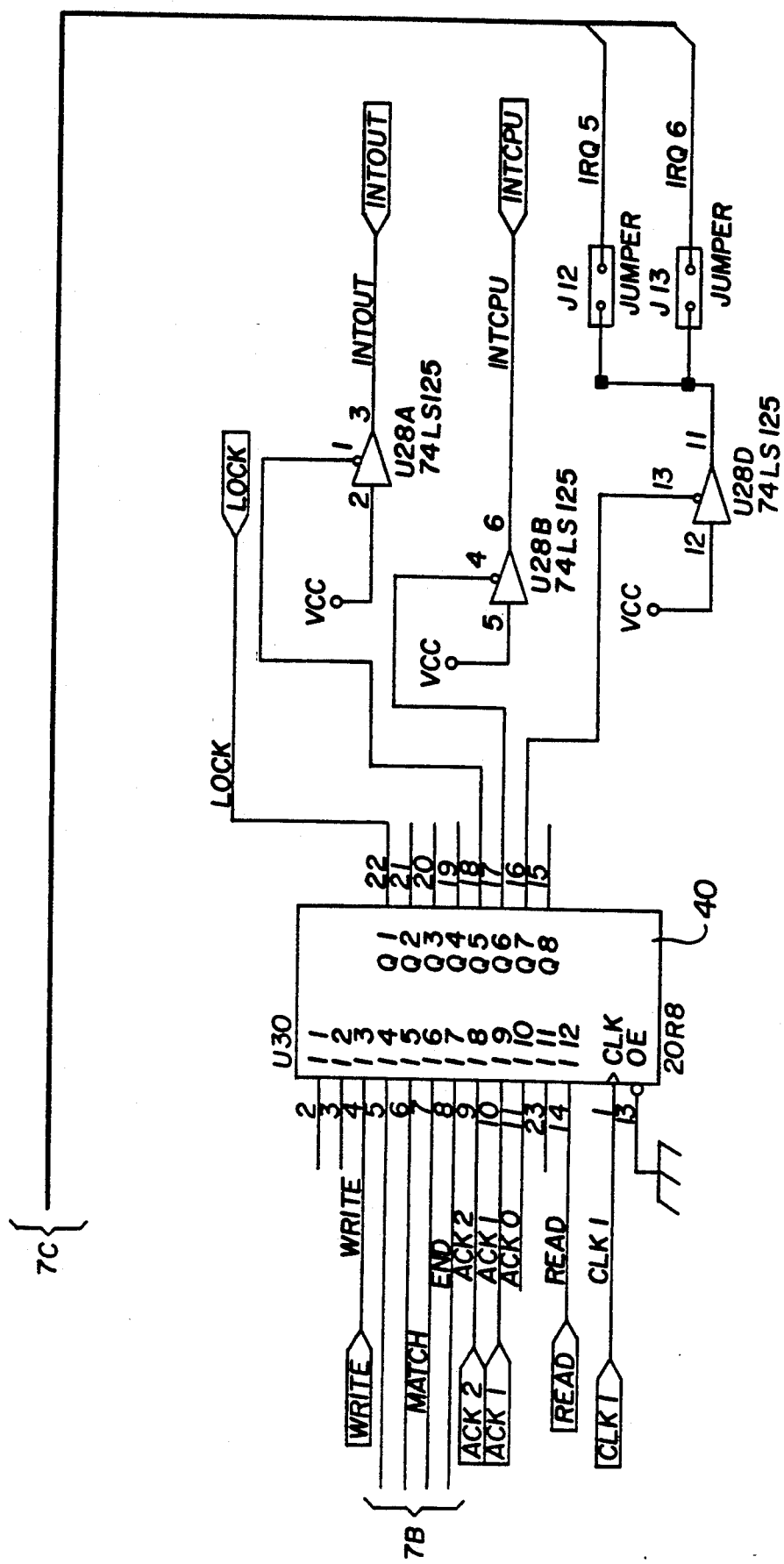

In one preferred arrangement, computer system 10 includes front end address driver 42, a front end data driver 44, a computer address cable 46 operatively connected to front end address driver 42, a computer data cable 48 operatively connected to front end data driver 44, a computer address cable driver 50 which drives the computer address cable responsive to its associated computer, and a computer data cable driver 52 which drives the computer data cable responsive to its computer. If the cable run is short enough, it is sometimes possible to connect the computer directly to the cables without the need for the drivers. Shared computer memory system 14 includes an internal memory address bus 54 and an internal memory data bus 56. Front end address and data bus drivers 42 and 44 are controlled by front end logic circuit 18. Front end address driver 42 drives memory address bus 54 responsive to the computer address cable 46, and front end data bus driver 44 drives memory data bus 56 responsive to computer data cable 48 but also drives computer data cable 48 responsive to memory data bus 56 since data flows both ways. Normally, of course, it would not be the same physical drivers both ways, but they might well be packaged together. Referring to FIG. 6 and FIG. 7, front end data bus driver 44 includes driver 44a and outbound latch 44b.

Figure 4:
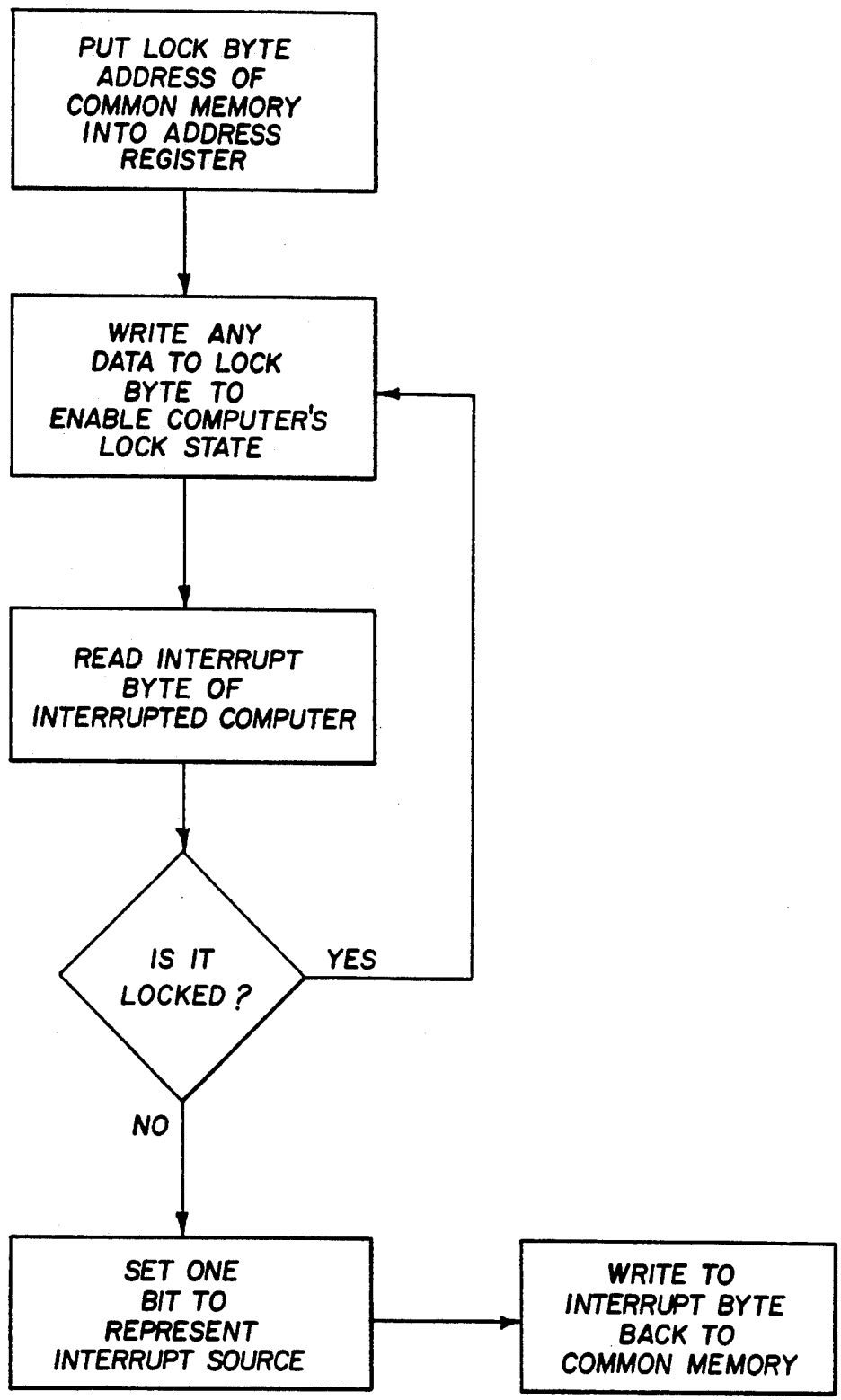
FIG. 4 is a flow diagram of a first computer thereof interrupting a second computer.

Referring to FIG. 4, a method for a first computer to interrupt a second computer is for the first computer to first put the lock byte address, in this case the starting address, of common memory into its address register. Then, write any data to the lock byte (byte 0) to enable the first computer's lock state. Then read the interrupt byte of common memory associated with the second computer and put the contents of that byte into the data Register of the first computer. Then test the interrupt byte for the second computer to see if it represents a locked state. For this example, Choose a 1 to represent that it is locked and a 0 to represent that it is not locked. If it is locked, go back to write data to the lock byte and repeat. If the byte associated with the second computer is not locked, then set the interrupt byte associated with the second computer to a value to indicate the first computer, i.e. if the first computer is computer number 3 and the second computer is computer number 4, then set the interrupt byte associated with computer number 4 to a value of Hex 8, that is bit 3 of the byte. After the data, Hex 8, is written back to the interrupt byte, then the hardware, interrupt and lock logic 40, generates a signal to interrupt computer 4. It is now easy to see that the interrupt byte associated with the second computer is used not only as a semaphore but also as data to tell who sent the interrupt.

Figure 5:
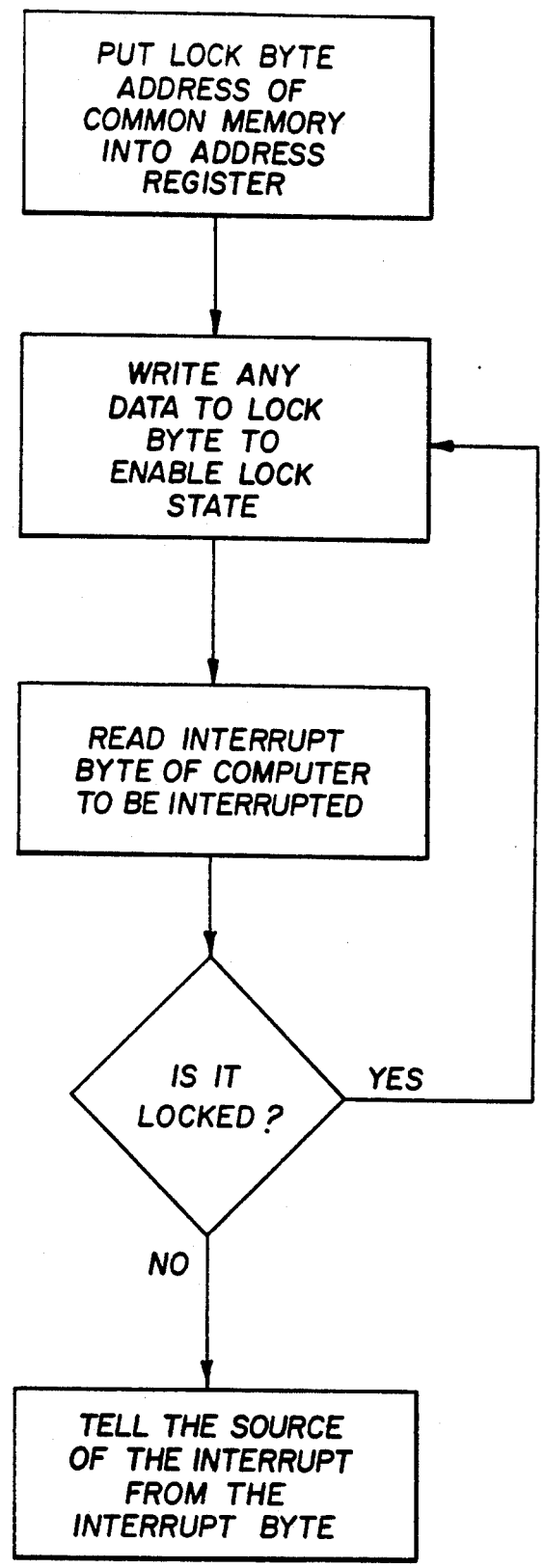
FIG. 5 is a flow diagram of the second computer thereof being interrupted and knowing what computer interrupted it.
Figure 6A:
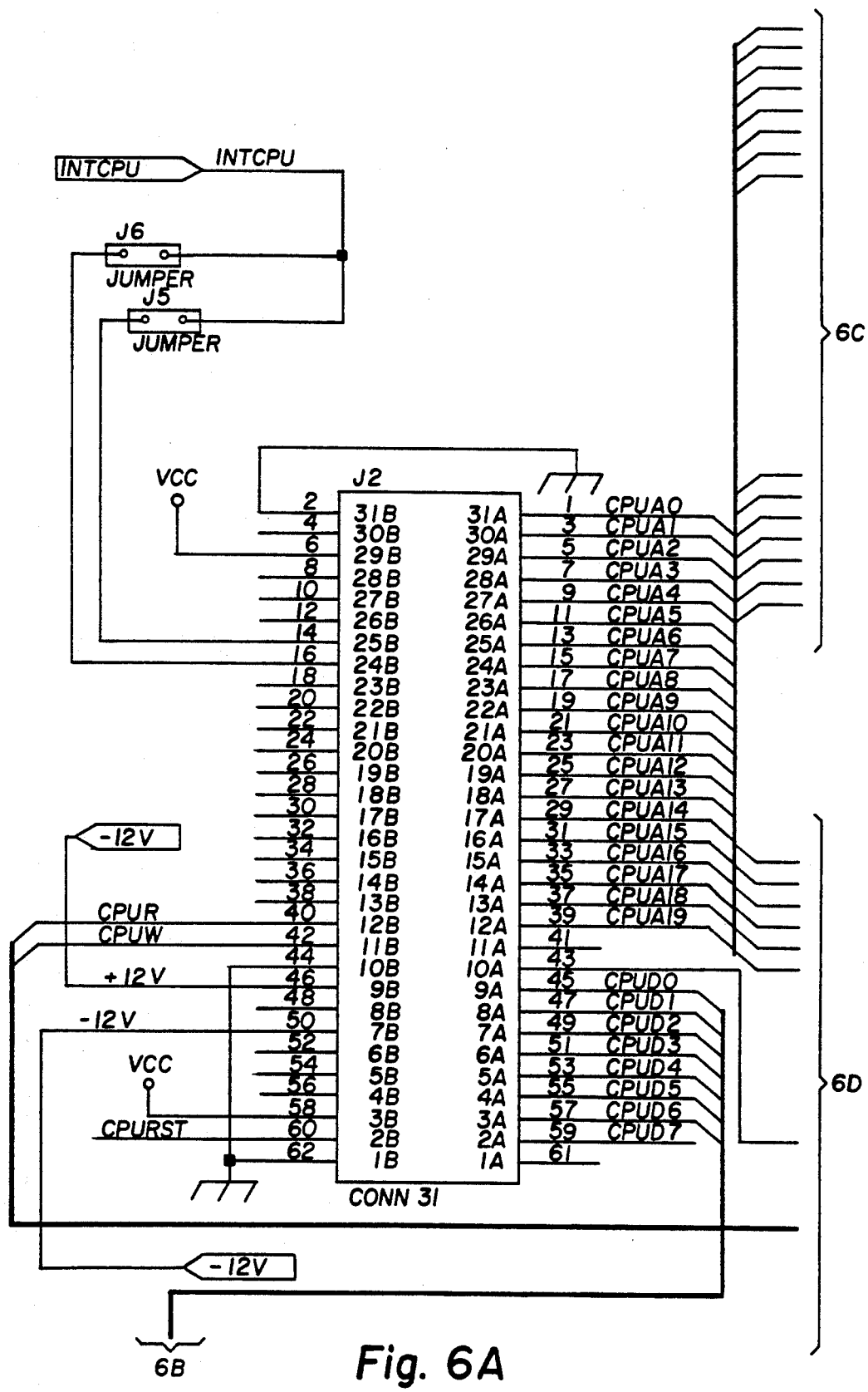
FIGS. 6A, 6B, 6C, 6D, 6E, 6F, taken together, are a wiring diagram showing a first front end circuit, a timing sequencer and a shared memory of a shared computer memory system according to the present invention.
Figure 6B:
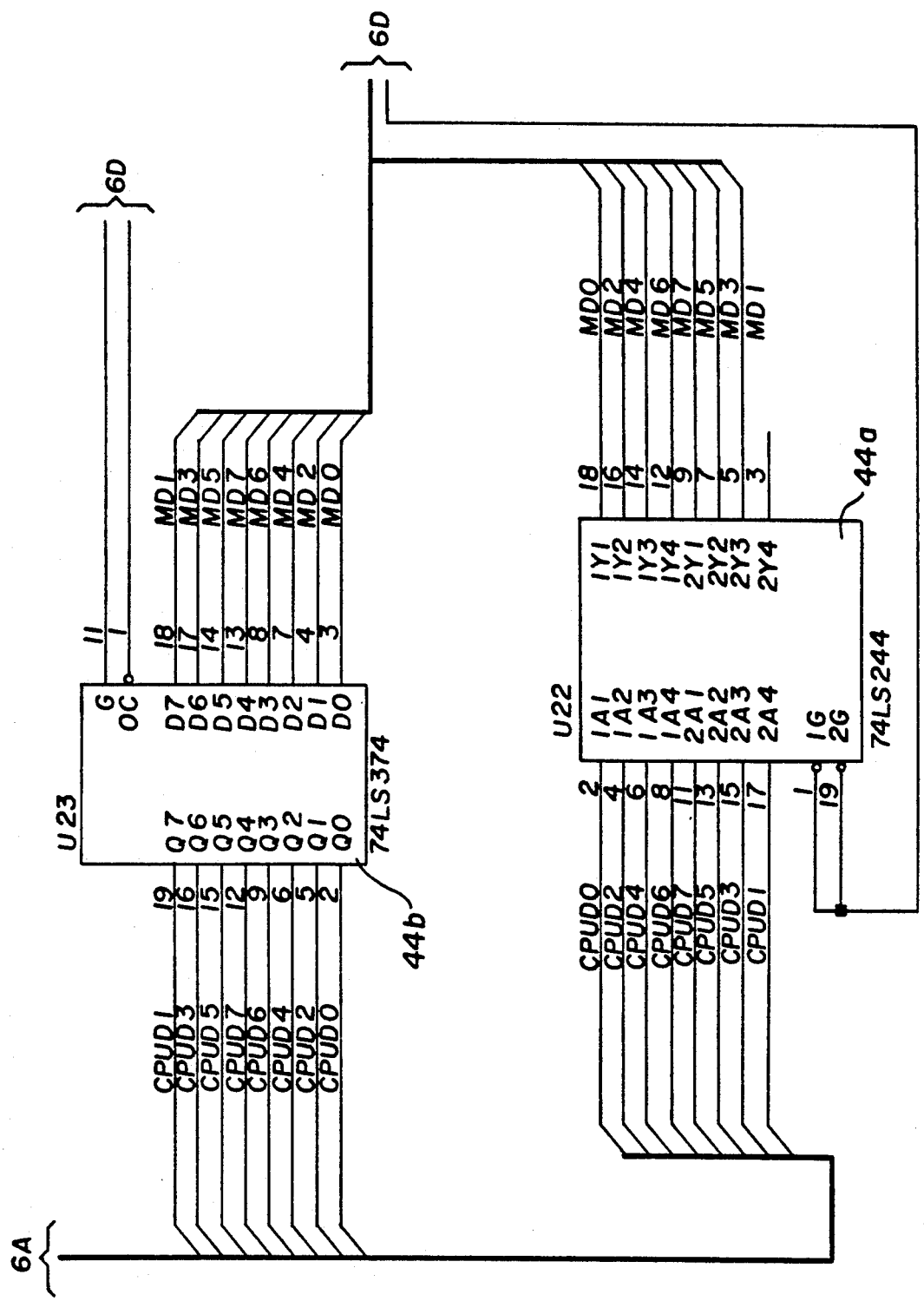
Figure 6C:
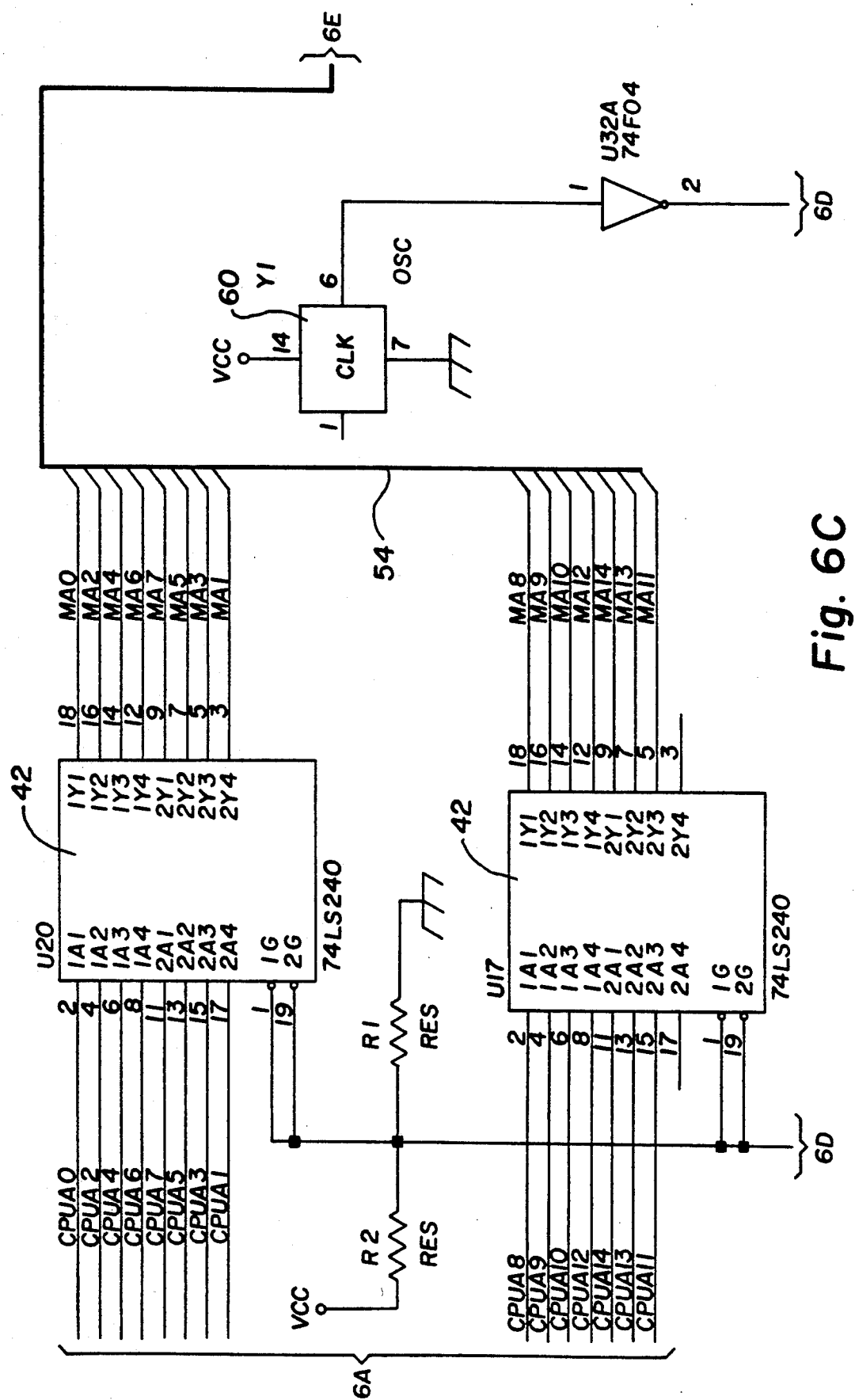
Figure 6D:
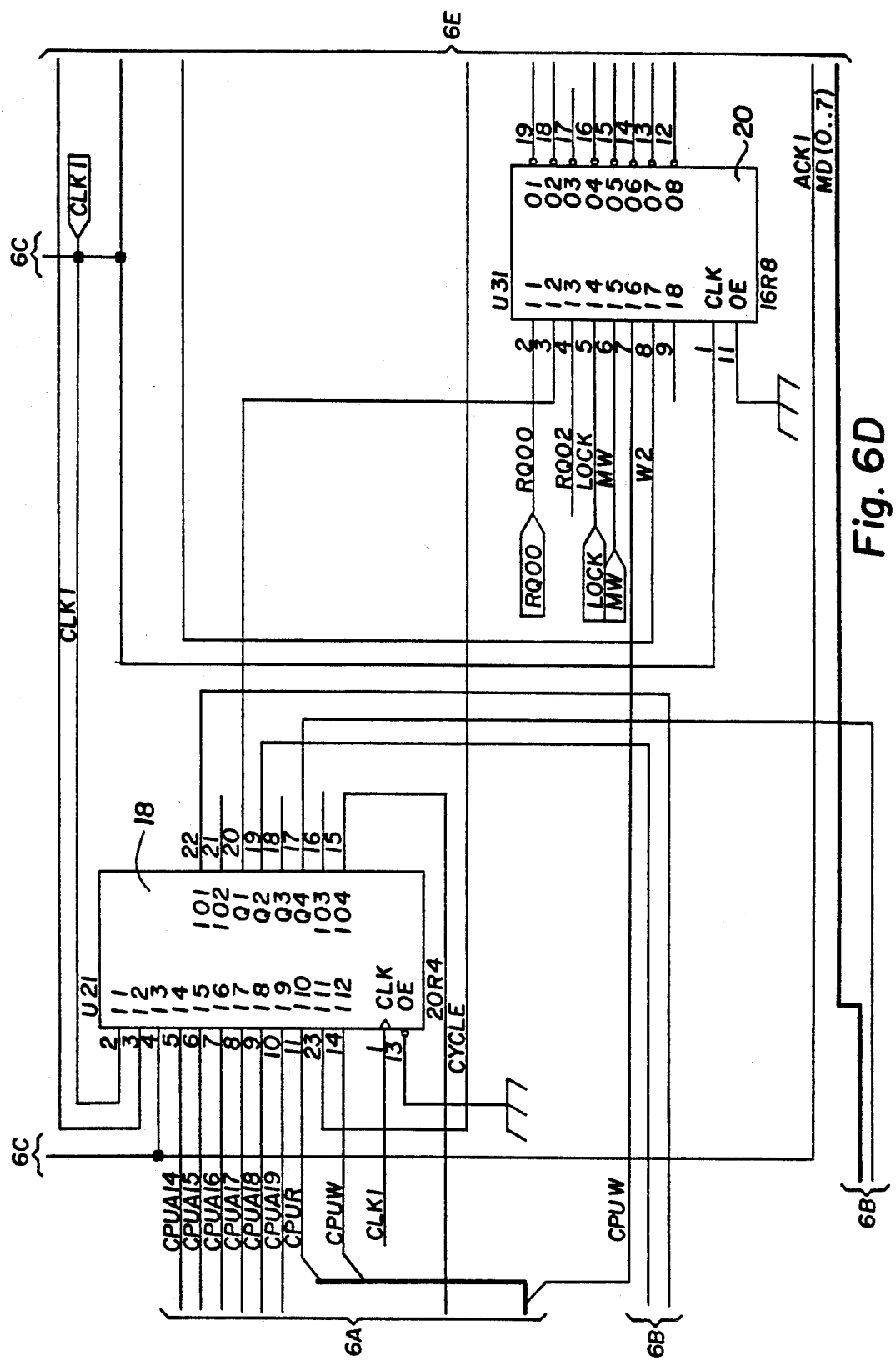
Figure 6E:
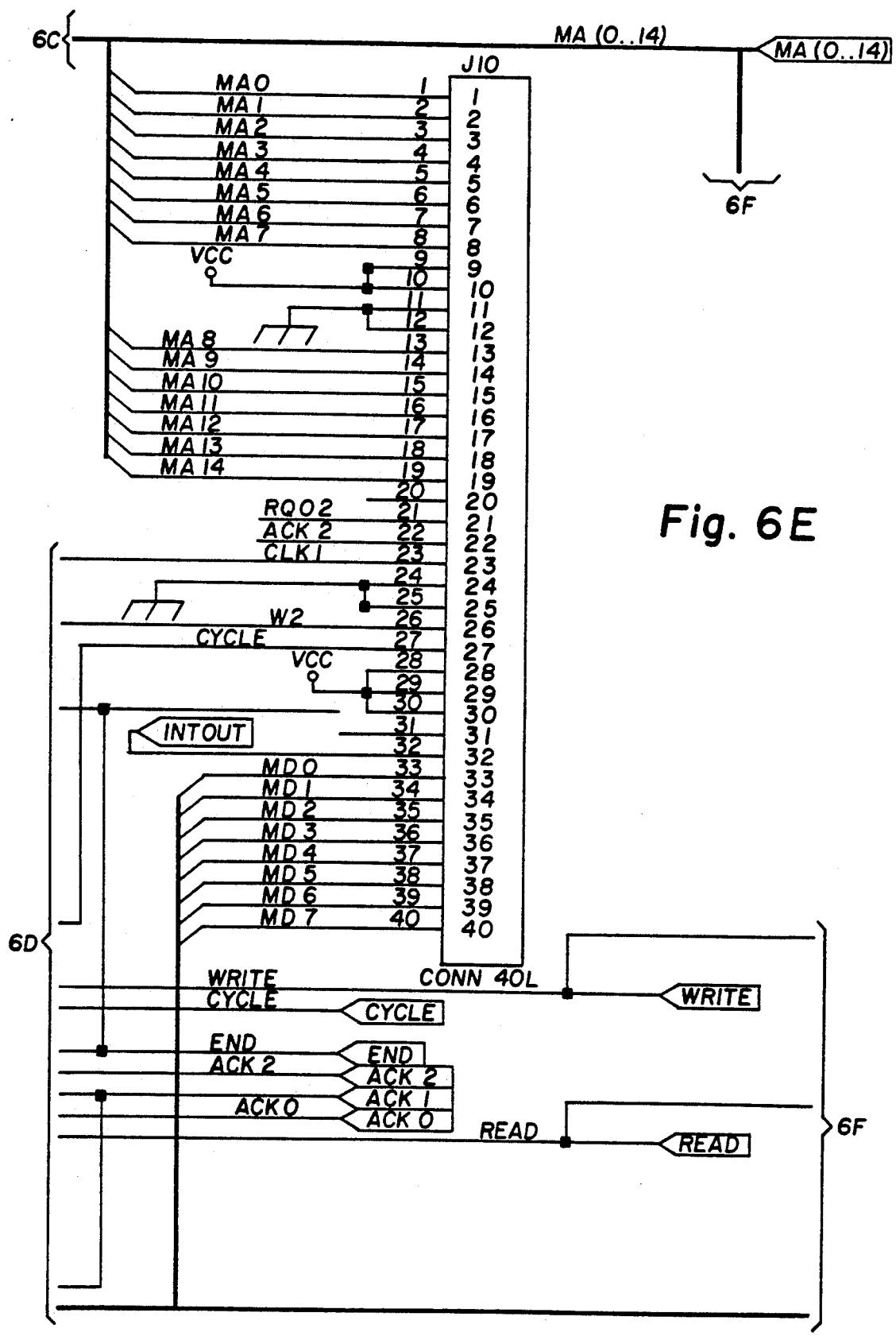
Figure 6F:
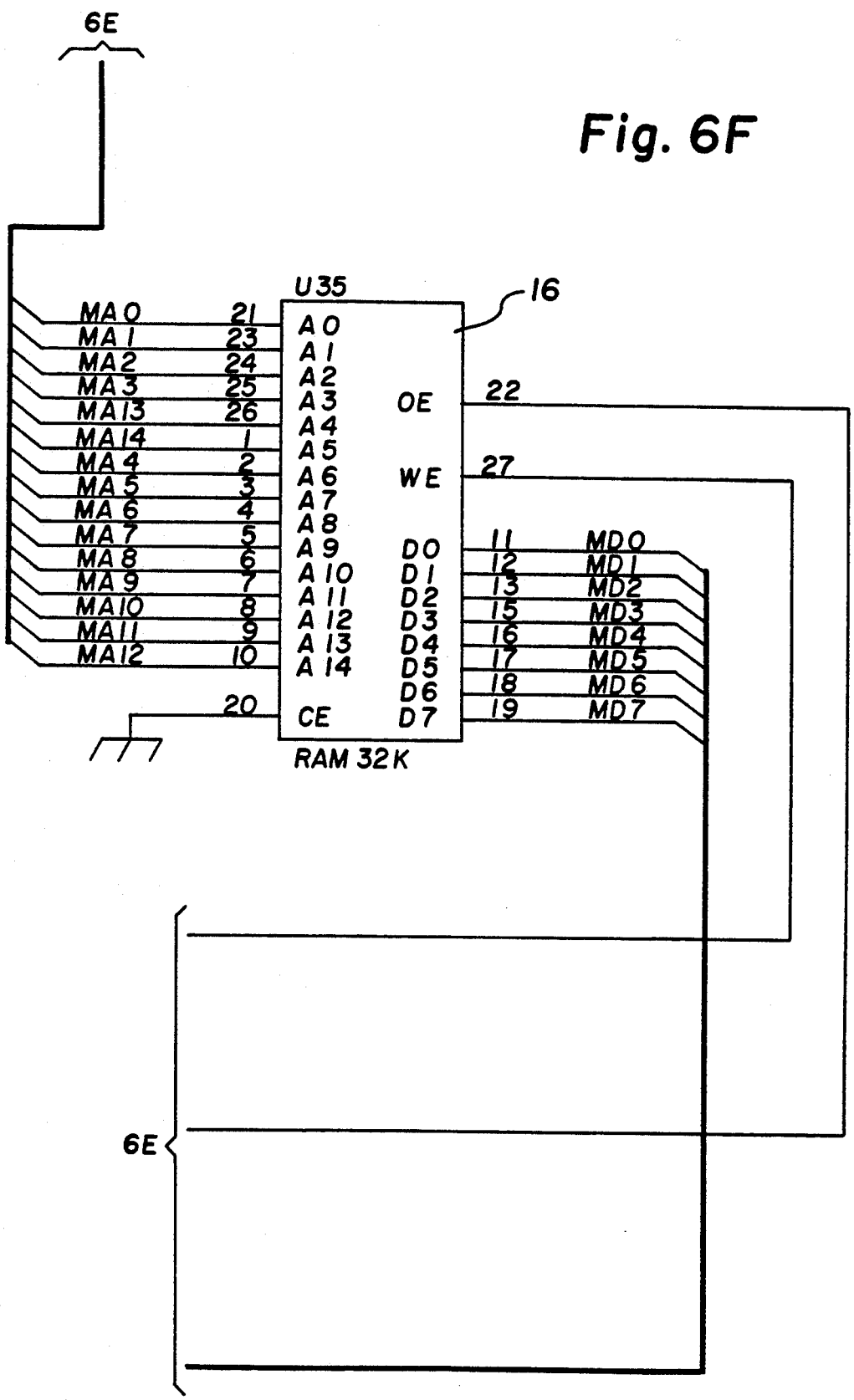

Referring also to FIG. 5, a method according to the present invention for the second computer which has had a hardware interrupt to try to know which computer caused the interrupt again starts with putting the starting address of common memory into its address register and writing any data to the lock byte to enable its lock state. The second computer then reads its own interrupt byte, i.e. that byte in the common memory associated with the second computer. Then the second computer tests that interrupt byte. If it is locked, then go back to write any data into the lock byte and repeat the subsequent steps. If it is not locked, then the second computer tests the value of its own interrupt byte which has the value indicating the first computer. The second computer can then clear its interrupt by writing a zero into its interrupt byte.

Referring now to FIG. 2 and FIG. 3, the front end logic for each phase is thus:

phase 1: output computer address to internal address bus until end of phase 4.

phase 2: if it is WRITE, output data to internal data bus until the end of phase 3. Release the request at the beginning of Phase 2.

phase 3: when it is READ, at the end of phase 3 latch the data from the internal data bus.

phase 4: release wait signal at the beginning of phase 4 as output data to computer bus 48.

The timing sequencer 20 for each phase would be:

phase 1: at beginning of phase 1, send out acknowledge 32 to the front end logic 18 in service; if there are two requests at the same time, the higher priority of the two gets the service; signal of acknowledge stays active until the end of phase 4. All ACK signals 55 specify which computer gets access to memory this time.

phase 2: activate R(read) signal 43 (if read) to random access memory (RAM) 16 and interrupt and lock logic 40 until the end of phase 3.

phase 3: activate W(write) signal 41 (if write) to RAM 16 and interrupt and lock logic 40 until the end of phase 3 (signal RAM to write data). Activate cycle signal to the front end logic until the end of phase 3.

phase 4: activate the end signal until the end of phase 4. If there are lock 45 and R(read) 43 signals at the end of phase 3, timing sequencer 20 will generate a W(write) signal 41 to random access memory and also force the lock bit 47, one bit of data bus, to be true from the beginning of phase 4 to the end of phase 4.

The interrupt and lock logic 40 is thus:

phase 1: decode the internal address 58 and generate an address match signal 57. The signal will exist until the end of phase 4.

phase 2:

phase 3: generate a lock signal 45 to timing sequencer 20 if the lock state of the accessing computer is enabled. The signal will exist until the end of phase 4.

phase 4: set or reset the interrupt flip flop if a WRITE to the interrupt byte (a match signal 57 and address bit 0 and bit 1). Set the lock flip flop (enable lock state) if there is a WRITE to the lock byte as shown in the logic equation. Reset the lock state if lock function is enabled and it is READ.

It is possible to leave out phase 2 if the device is fast enough.

Referring now to FIG. 6 and FIG. 7, one specific embodiment of shared computer memory system 14 using 15 nanosecond PAL can be described as:

j2: connected to computer 1. It can be PC, AT or 386 with PC bus.

j17: connected to computer 2. It can be PC, AT or 386 with PC bus.

j10: connected to another front end logic (not listed) then to computer 3

U36, u37: Those are data driver in front end logic circuit for computer 1

U39, u40: Those are address driver in front end logic circuit for computer 1

U38: PAL 20R4 is logic control in front end logic circuit for computer 1

U22, u23: Those are data driver in front end logic circuit for computer 2

U17, u20: Those are address driver in front end logic circuit for computer 2

U21: 20R4 is logic control in front end logic circuit for computer 2

U31: PAL 16R8 is timing sequencer in internal control logic circuit

U29: PAL 16L8 is address decoder in internal control logic circuit

U30: PAL 20R8 is interrupt and lock circuit in internal control logic circuit

U28: It makes the interrupt signal an open collector signal.

U35: It is a 32K×8 or 8K×8 static memory. The speed is 30 nsec to 100 nsec depending on clock.

U32: It is a clock driver.

Y1: The oscillator provides memory system clock. It works from 15 Mhz to 40 Mhz

All of the PAL equations are listed below. The device is a PAL 20R4. The location is U21 and U38. It is front end logic. The signal name for each pin is listed below, where "!" means low active for signal definitions. In the equations, "!" is a logical "not", "&" is the logical "and" and "#" is the logical "or." ".D" represents a flip-flop output, and .OE is an output enable signal.

| pin 1 =CLK; | pin 9 =A18; | pin 17 = !WD; |
|---|---|---|
| pin 2 =CLK; | pin 10 =A19; | pin 19 = !RDLH; |
| pin 3 =!END; | pin 11 =!RA; | pin 20 = !REQUEST; |
| pin 4 =!ACK; | pin 12 =GND; | pin 21 = !DISABLE; |
| pin 5 =A14; | pin 13 =GROUND; | pin 22 = !RDOE; |
| pin 6 =A15; | pin 14 =!WA; | pin 23 = !CYCLE; |
| pin 7 =A16; | pin 15 =!WAIT; | pin 24 = VCC; |
| pin 8 =A17; | pin 16 =!REQ; | |

The logic equations are:

```
AEQ = A19 & A18 & !A17 & A16 & !A15;
    /* ADDRESS SEGMENT = D0000 */
WAIT.OE = AEQ;
WAIT = AEQ & RA & !DISABLE # AEQ & WA &
    !DISABLE;
DISABLE = REQ & END & ACK # DISABLE & REQ;
REQ = RA & CLK & AEQ # WA & CLK & AEQ # AEQ &
    RA & REQ # AEQ & WA & REQ;
REQUEST.D = REQ & !DISABLE & !ACK & !END #
    REQUEST & !DISABLE & !ACK & !END;
RDOE = REQ & RA & DISABLE;
RDLH.D = !CYCLE & RA & ACK & !END;
WD.D = WA & ACK & !END & !cycle;
```

The device is a PAL 16R8. The location is U31. It is TIMING SEQUENCER.

The signal name for each pin is listed below and '!' means low active.

| pin 1 =CLK; | pin 8 =!W3; | pin 15 = !ACK3; |
|---|---|---|
| pin 2 =!REQ1; | pin 10 =GND; | pin 16 = !END; |
| pin 3 =!REQ2; | pin 11 =GROUND; | pin 17 = !ERAM; |
| pin 4 =!REQ3; | pin 12 =!READ; | pin 18 = !CYCLE; |
| pin 5 =!LOCK; | pin 13 =!ACK1; | pin 19 = !WRITE; |
| pin 6 =!W1; | pin 14 =!ACK2; | pin 20 = VCC; |
| pin 7 =!W2; | | |

The logic equations are listed below:

| ACK1.D | = REQ1 & !ACK2 & !ACK3 & !ACK1 & !END # ACK1 & !END; |
|---|---|
| ACK2.D | = REQ2 & !ACK1 & !ACK2 & !ACK3 & !REQ1 & !END # ACK2 & !END; |
| ACK3.D | = REQ3 & !ACK1 & !ACK2 & !ACK3 & !REQ1 & !REQ2 & !END # ACK3 & !END; |
| END.D | = CYCLE & !END; |
| ERAM.D | = ACK1 & !ERAM & !END # ACK2 & !ERAM & |

```
                !END # ACK3 & !ERAM & !END #
                ERAM & !CYCLE;
CYCLE.D       = ERAM & !CYCLE;
READ.D        = ACK1 & !W1 & !ERAM & !END # ACK2 & !W2 &
                !ERAM & !END # READ & !CYCLE # ACK3 &
                W3 & !ERAM & !END;
WRITE.D       = !READ & ERAM & !CYCLE # LOCK &
                READ & CYCLE;
```

The device is PAL 16L8. The location is U30. It is an ADDRESS DECODER and do the function of setting the lock bit. The signal name for each pin listed below and '!' means low active.

```
pin 1 = A2;     pin 8 = A9;      pin 15 = A14;
pin 2 = A3;     pin 9 = A10;     pin 17 = !LOCK;
pin 3 = A4;     pin 10 = GND;    pin 18 = !END;
pin 4 = A5;     pin 11 = A11;    pin 19 = !MATCH;
pin 5 = A6;     pin 12 = MDO;    pin 20 = VCC;
pin 6 = A7;     pin 13 = A12;
pin 7 = A8;     pin 14 = A13;
```

The logic equations are:

```
MATCH     = A2 & A3 & A4 & A5 & A6 & A7 & A8 & A9 & A10
            & A11 & A12 & A13 & A14;
MDO.OE    = LOCK & END;
MDO       = A2 & !A2;
```

The device is PAL 20R8. The location is U30. It is INTERRUPT AND LOCK LOGIC.

The signal name for each pin is listed below and '!' means low active.

```
pin 4 = !WRITE;   pin 11 = !ACK1;     pin 18 = !INT3;
pin 5 = AO;       pin 12 = GROUND;    pin 19 = !LOCK1;
pin 6 = A1;       pin 13 = GROUND;    pin 20 = !LOCK2;
pin 7 = !MATCH;   pin 14 = !READ;     pin 21 = !LOCK3;
pin 8 = !END;     pin 15 = !CLRINT;   pin 22 = !LOCK;
pin 9 = !ACK3;    pin 16 = !INT1;     pin 24 = VCC;
pin 10 = !ACK2;   pin 17 = !INT2;
```

The logic equations are:

```
INT1.D    = MATCH & !AO & A1 & ACK2 & WRITE &
            !LOCK # MATCH & !AO & A1 & ACK3 &
            WRITE & !LOCK # INT1 & !
            (CLRINT & ACK1)
INT2.D    = MATCH & AO & !A1 & ACK1 & WRITE &
            !LOCK # MATCH & AO & !A1 & ACK3 &
            WRITE & !LOCK # INT2 & !
            (CLRINT & ACK2);
INT3.D    = MATCH & !AO & !A1 & ACK2 & WRITE &
            !LOCK # MATCH & !AO & !A1 & ACK1
            & WRITE & !LOCK # INT3 & ! (CLRINT
            & ACK3);
CLRINT.D  = MATCH & !AO & A1 & ACK1 & WRITE &
            !LOCK #MATCH & AO & !A1 & ACK2 &
            WRITE & !LOCK #MATCH & !AO & !A1
            & ACK3 & WRITE & !LOCK;
LOCK1.D   = MATCH & AO & A1 & ACK1 & WRITE &
            !END # LOCK1 & !(LOCK & ACK1);
LOCK2.D   = MATCH & AO & A1 & ACK2 & WRITE &
            !END # LOCK2 & !(LOCK & ACK2);
LOCK3.D   = MATCH & AO & A1 & ACK3 & WRITE & .
            !END # LOCK3 & !(LOCK & ACK3);
LOCK.D    = READ & ACK1 & LOCK1 # READ &
            ACK2 & LOCK2 # READ & ACK3 & LOCK3;
```

It is now easy to see that memory address bus 54 and memory data bus 56 are entirely internal to shared computer memory system 14, all of which can be kept quite small and compact, with distances measured in inches or less rather than feet. It is even possible to put the entire shared computer memory system on a single chip. Further, since the front end logic circuits control the front end address and data drivers, a cable from a computer can be longer by changing the coupling of the driver with the other end. The internal service speed is thus extremely fast compared to comparable computer networks of the past.

Generally, any computer can interrupt any other computer by writing data to a predetermined location. The interrupted computer will know where the interrupt came from by reading that location. A locking semaphore is implemented in the common memory to provide an easy way to do communication and make the interrupt mechanism possible. The common memory provides a data pool among asynchronous tasks running in different computers and having a real time response. The length of cable that hooks different computers to the system by vary by changing the front end driver since the interface is asynchronous, and the internal logic and the front end logic are separated.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments of may be made of the invention without departing from the scope thereof, it is to be understood that all matter herein set forth or shown in the figures of the accompanying drawing is to be interpreted as illustrative and not in a limiting sense.

I claim:

1. In a computer system, the combination comprising:
   a plurality of computers;
   a common memory;
   a plurality of front end circuits associated with the common memory, each such front end circuit operatively connected to one computer of the plurality of computers for each such computer;
   an internal service logic including a timing sequencer operatively connected to both the common memory and the plurality of front end circuits, wherein a front end circuit from the plurality requests service from the timing sequencer when the computer associated with that front end circuit attempts to read from or write to the common memory;
   a fixed frequency clock for the plurality of front end circuits and the internal service logic including the timing sequencer
   a memory address bus operatively connected to the plurality of front end circuits and to the common memory; and
   a memory data bus operatively connected to the plurality of front end circuits and to the common memory, wherein the plurality of front end circuits pass addresses and data from one of the plurality of computers only during the time of acknowledgement from the timing sequencer through the associated front end circuit whereby each front end circuit of the plurality synchronizes any request from the respective processor with the fixed frequency clock.

2. A combination according to claim 1 wherein one bit of a common memory location is designated as a locking semaphore to be set for a READ of that location by the respective computer, followed by a WRITE back to the same location issued by the internal service logic.

3. A combination according to claim 2 wherein the internal service logic further comprises an interrupt and lock circuit operatively connected to both the timing sequencer and each of the plurality of computers, which interrupt and lock circuit sets or resets an interrupt signal associated with a computer of the plurality of processors wherein the interrupt and lock logic generates an interrupt to a second computer when a first computer of the plurality writes to a particular location in common memory associated with the second computer and the second computer writes to that location resetting the interrupt.

4. A combination according to claim 3 wherein a front end circuit associated with a particular computer comprises a front end logic circuit, a front end address driver controlled by the front end logic circuit and a front end data driver controlled by the front end logic circuit, the combination further comprising:
- a computer address cable operatively connected to the front end address driver and the particular computer;
- a processor computer data cable operatively connected to the front end data driver and the particular computer;
- wherein the memory address bus is operatively connected to the front end address driver and to the common memory wherein the front end driver drives the memory address bus responsive to the computer address cable; and
- wherein the memory data bus is operatively connected to the front end data driver and to the common memory wherein the front end data driver drives the memory data bus responsive to computer data cable and drives the computer data cable responsive to the memory data bus.

5. A combination according to claim 1 wherein a front end circuit associated with a particular computer comprises a front end logic circuit, a front end address driver controlled by the front end logic circuit and a front end data driver controlled by the front end logic circuit, the combination further comprising:
- a computer address cable operatively connected to the front end address driver and the particular computer;
- a computer data cable operatively connected to the front end data driver and the particular computer;
- wherein the memory address bus is operatively connected to the front end address driver and the common memory wherein the front end driver drives the memory address bus responsive to the computer address cable; and
- wherein the memory data bus is operatively connected to the front end data driver and the common memory wherein the front end data driver drives the memory data bus responsive to the computer data cable and drives the computer data cable responsive to the memory data bus.

6. A combination according to claim 5 wherein one bit of a common memory location is designated as a locking semaphore to be set for a READ of that location by that computer, followed by a WRITE back to the same location issued by the internal service logic.

7. A combination according to claim 1 wherein a front end circuit from the plurality comprises in combination:
- a latch circuit that synchronizes only the leading edge of a request signal;
- a half latch circuit that blocks the request signal until the end of a computer read/write cycle time, wherein the half latch circuit includes at least two inputs and one output with only one feedback line to extend one input signal to the end of the other input signal; and
- a D flip-flop delay located between the latch circuit and the timing sequencer.

8. A combination according to claim 7 wherein the front end circuit further includes a read data latch circuit that latches the read data at the end of a common memory read cycle and output of data until the end of the computer read cycle.

9. A shared memory system for use with a plurality of buses, comprising in combination:
- a memory;
- a plurality of front end circuits, each such front end circuit for operative connection to one bus of the plurality of buses for each such bus;
- a timing sequencer operatively connected to both the memory and the plurality of front end circuits, wherein a front end logic circuit from the plurality requests service from the timing sequencer when the bus associated with that front end circuit attempts to read from or write to the memory and allows the bus to effectively move data to or from the memory;
- a fixed frequency clock for the plurality of front end circuits and the timing sequencer;
- a memory address bus operatively connected to the memory and effectively connected to the plurality of buses by means of the plurality of front end circuits; and
- a memory data bus operatively connected to the memory and effectively connected to the plurality of buses by means of the plurality of front end circuits, wherein the plurality of front end circuits pass addresses and data from one of the plurality of buses only during the time of acknowledgement from the timing sequencer through the associated front end circuit whereby each front end circuit of the plurality synchronizes any request from the respective bus with the fixed frequency clock.

10. A shared memory system for use with a plurality of buses according to claim 9, wherein the plurality of buses operate independently of the fixed frequency clock.

11. A shared memory system according to claim 10 wherein at least one of the plurality of front end circuits comprises:
- a front end logic circuit;
- a front end address driver controlled by the front end logic circuit;
- a front end data driver controlled by the front end logic circuit;
- and wherein the memory address bus is operatively connected to the front end address driver and wherein the front end address driver drives the memory address bus responsive to a bus from the plurality which is associated with the front end logic circuit; and wherein the memory data bus is operatively connected to the front end data driver and wherein the front end data driver drives the memory data bus responsive to the bus from the plurality and effectively sends to the bus from the plurality responsive to the memory data bus.

12. A shared memory system according to claim 11 further including an interrupt and lock logic circuit, wherein one bit of each location in the memory is designated as a locking semaphore to be set for a READ of that location by that bus, followed by a WRITE back to the same location issued by the interrupt and lock logic circuit.

13. A combination according to claim 9 wherein a front end circuit from the plurality comprises in combination:

a latch circuit that synchronizes only the leading edge of a request signal;

a half latch circuit that blocks the request signal until the end of a read/write cycle time of a bus from the plurality of buses, wherein the half latch circuit includes at least two inputs and one output with only one feedback line to extend one input signal to the end of the other input signal; and a D flip-flop delay located between the latch circuit and the timing sequencer.

14. A combination according to claim 13 wherein the front end circuit further includes a read data latch circuit that latches the read data at the end of a memory read cycle and output of data until the end of the bus read cycle.

* * * * *